US008675739B2

(12) United States Patent
Baik et al.

(10) Patent No.: US 8,675,739 B2
(45) Date of Patent: Mar. 18, 2014

(54) METHOD AND APPARATUS FOR VIDEO DECODING BASED ON A MULTI-CORE PROCESSOR

(75) Inventors: Hyun-Ki Baik, Seongnam-si (KR); Grigory Abuladze, Suwon-si (KR); Yun-Il Kim, Seoul (KR); Se-Hyun Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1004 days.

(21) Appl. No.: 12/336,772

(22) Filed: Dec. 17, 2008

(65) Prior Publication Data

US 2009/0154572 A1 Jun. 18, 2009

Related U.S. Application Data

(60) Provisional application No. 61/014,149, filed on Dec. 17, 2007.

(30) Foreign Application Priority Data

Jan. 15, 2008 (KR) .................. 10-2008-0004533

(51) Int. Cl.
*H04N 7/26* (2006.01)
(52) U.S. Cl.
USPC ..................................................... 375/240.25
(58) Field of Classification Search
USPC .......................................... 375/240.01, 240.25
IPC ......................................................... H04N 7/26
See application file for complete search history.

(56) References Cited

U.S. PATENT DOCUMENTS

| 5,532,744 A | 7/1996 | Akiwumi-Assani et al. |
| 5,870,310 A * | 2/1999 | Malladi .................... 716/124 |
| 6,748,019 B1 | 6/2004 | Lin et al. |
| 2005/0053157 A1 | 3/2005 | Lillevold |
| 2007/0143759 A1* | 6/2007 | Ozgur et al. ............. 718/102 |
| 2008/0187053 A1* | 8/2008 | Zhao et al. ............ 375/240.25 |

FOREIGN PATENT DOCUMENTS

| JP | 11-272623 | 10/1999 |
| KR | 2005-78153 | 8/2005 |

* cited by examiner

*Primary Examiner* — Jay Patel
*Assistant Examiner* — Yulin Sun
(74) *Attorney, Agent, or Firm* — NSIP Law (57) ABSTRACT

A multi-core processor device and a video decoding method using a multi-core processor, which can efficiently use system resources in a multi-core processor environment that requires a considerable amount of computation. The multi-core processor device includes a video decoder module which includes a plurality of function modules for performing video decoding; a memory which stores an input bitstream and loads the function modules; and a multi-core processor which includes a plurality of cores that perform a video decoding operation on the input bitstream by using the function modules, the cores including a first core and a second core, wherein, if the first core becomes idle during the video decoding operation, the second core allocates part of a remaining task of the second core to the first core and thus reduces an idle time of the first core.

17 Claims, 11 Drawing Sheets

METHOD AND APPARATUS FOR VIDEO DECODING BASED ON A MULTI-CORE PROCESSOR

CROSS-REFERENCE TO RELATED APPLICATIONS

This application claims the benefit of U.S. Provisional Application No. 61/014,149 filed on Dec. 17, 2007 in the United States Patent and Trademark Office and Korean Application No. 2008-4533 filed on Jan. 15, 2008 in the Korean Intellectual Property Office, the disclosures of which are incorporated herein by reference.

BACKGROUND OF THE INVENTION

1. Field of the Invention

Aspects of the present invention relate to video decoding technology, and, more particularly, to a multi-core processor device and a video decoding method using a multi-core processor, which can efficiently use system resources in a multi-core processor environment that requires a considerable amount of computation.

2. Description of the Related Art

As information technology including Internet-related techniques develops, an increasing number of people are engaging in video communication as well as text and voice communication. Since conventional text-based communication methods are insufficient to meet various demands from users, the demand for multimedia services that can provide various types of data such as text, video, and music data has steadily grown. Due to the large size of multimedia data, storage media having a large storage capacity are required to store multimedia data, and wide bandwidths are required to transmit multimedia data. Therefore, compression coding techniques are essential for the transmission of multimedia data including text, video and audio data.

One of the basic principles for the compression of data is to remove redundancy in the data. Since video data generally has a larger size than other types of multimedia data, it is important to effectively compress video data.

The compression of video data is generally characterized by removing spatial redundancy, such as repetitions of the same color or the same object within a single picture or frame; removing temporal redundancy, such as repetitions of the same sound over time; and removing perceptive redundancy in consideration of the properties of human perception, such as insensitivity to high frequencies. Conventionally, temporal redundancy in data is removed using a motion compensation-based temporal filtering method, and spatial redundancy in data is removed using a spatial transform method.

Conventionally, the coding and decoding of video data is performed by single-core processors. However, as multi-core processors that can provide more powerful functions than single-core processors are becoming widespread, multi-core processors are becoming widely used in various fields, including the field of video coding/decoding that requires considerable amounts of system resources.

Multi-core processors are integrated circuits (ICs) having two or more cores integrated therein and are thus capable of providing powerful functions, reducing power consumption and effectively processing more than one task at the same time. Multi-core processors are comparable to computers having two or more independent processors. However, multi-core processors have two or more processors plugged into the same socket and can thus provide a better connection between the processors. Theoretically, the performance of dual-core processors is twice the performance of single-core processors. However, in practice, the performance of dual-core processors is only about 1.5 times better than the performance of single-core processors. Since it is generally believed that single-core processors have reached a limit in terms of complexity and speed, the growth of multi-core processor-related industry has recently been expedited. There are many multi-core processor makers, such as AMD, ARM, and Intel, that are gearing up to develop better products in anticipation that multi-core processors will prevail in the near future.

Figure 1:
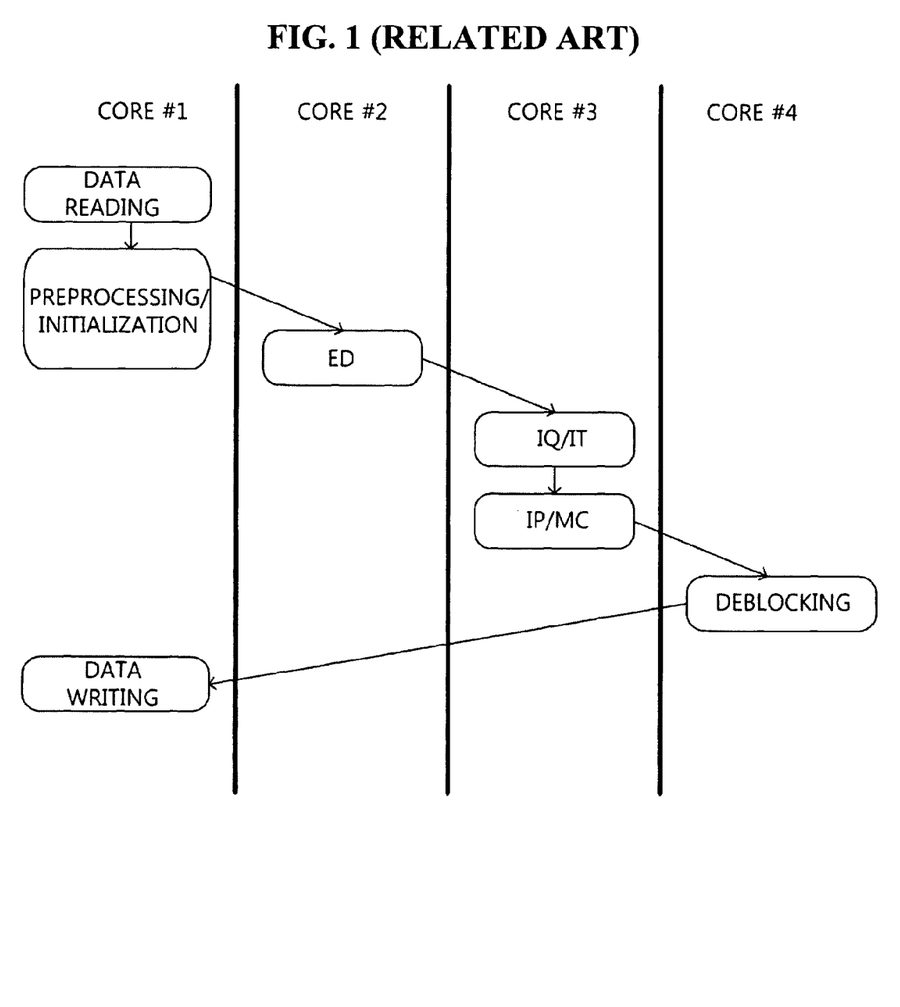
FIG. 1 illustrates a diagram explaining a conventional functional division method.
Figure 2:
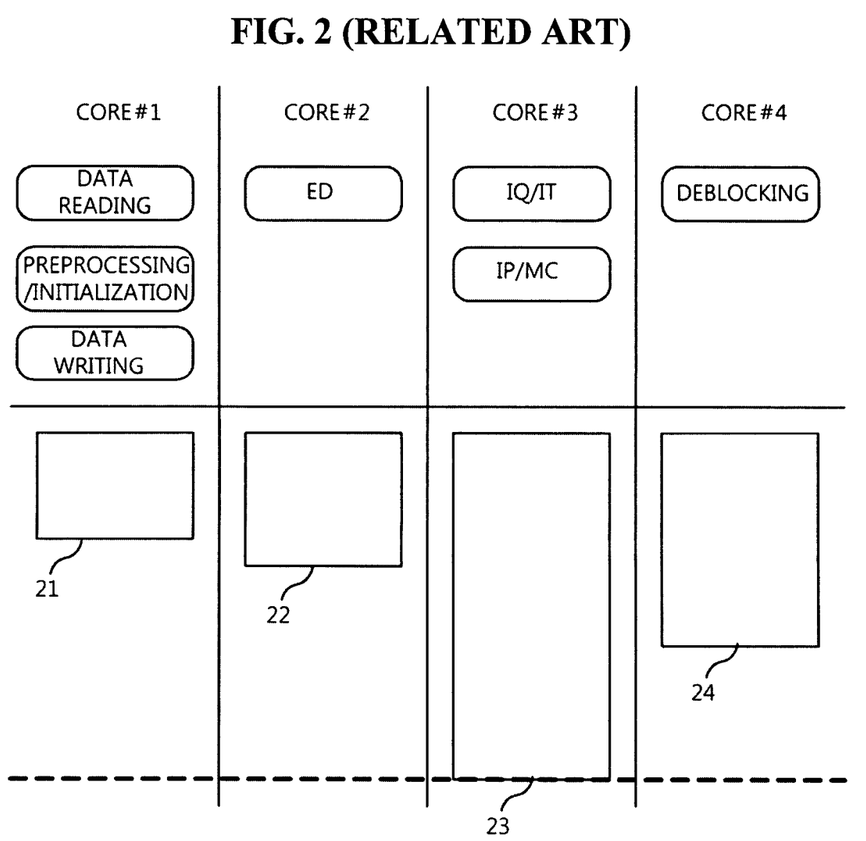
FIG. 2 illustrates a diagram explaining load imbalances caused by the conventional functional division method illustrated in FIG. 1.

Conventional video decoding methods using a multi-core processor are largely classified into a functional division method and a data division method. FIGS. 1 and 2 explain the functional division method. Referring to FIG. 1, in order to perform a video decoding operation, a processor needs to perform various functions such as data reading, preprocessing/initialization, entropy decoding, inverse quantization, inverse transform, intra-prediction, motion compensation, and deblocking and data writing.

In the functional division method, a plurality of cores of a processor may be determined in advance to perform certain functions only. For example, core 2 may only perform entropy encoding, and core 4 may only perform deblocking. In this case, imbalances may occur among computation amounts 21 through 24 of cores 1 through 4, as shown in FIG. 2. In particular, core 3 having a relatively excessive load may serve as a critical path and may thus deteriorate the performance of the whole processor. The functional division method is easy to implement. However, since the amount of time taken to process functions varies from one core to another core of a multi-core processor, it is difficult to properly process more than one task in parallel using the functional division method and thus to fully utilize the functions of a multi-core processor.

Figure 3:
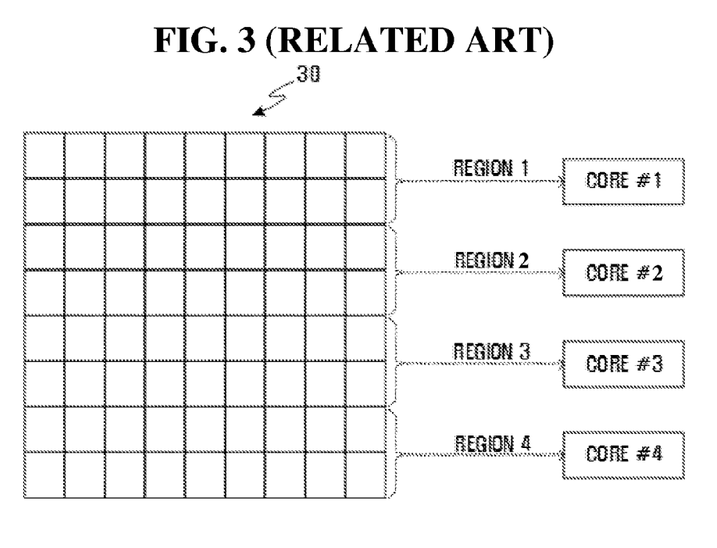
FIG. 3 illustrates a diagram explaining a conventional data division method.

FIG. 3 explains the data division method. Referring to FIG. 3, the data division method may be characterized by dividing a single picture 30 into, for example, four equal regions (i.e., regions 1 through 4), and allocating regions 1 through 4 to cores 1 through 4, respectively. Then, regions 1 through 4 can be processed by cores 1 through 4, respectively.

The data division method can secure high parallelism for simple data processes. However, the data division method is difficult to implement, especially when there is dependency between data processes. In order to address these difficulties, additional processes, such as the division of data and the prediction of the relationship between computation loads, are required. Thus, the performance of a multi-core processor may deteriorate considerably. In addition, the data division method requires each core of a multi-core processor to be equipped with all functions for performing a video decoding operation and thus causes inefficiency in the use of system resources (such as local storage). In particular, H.264 decoders, which have been widely used in recent years, have larger computation amounts and higher inter-function dependency than decoders based on other standards and thus may not be able to fully perform the functions of multi-core processors.

SUMMARY OF THE INVENTION

Aspects of the present invention improve the performance of multi-core processor-based video decoding by sharing independent processes that are not dependent upon one another between multiple cores.

According to an aspect of the present invention, a multi-core processor device is provided. The device includes a video decoder module comprising a plurality of function modules to perform video decoding; a memory to store an input bitstream and to load the function modules; and a multi-core processor including a plurality of cores to perform a video decoding operation on the input bitstream using the function modules, the cores including a first core and a second core; wherein, if the first core becomes idle during the video decoding operation, the second core allocates part of a remaining task of the second core to the first core so as to reduce an idle time of the first core.

According to another aspect of the present invention, a video decoding method using a multi-core processor is provided. The video decoding method includes storing an input bitstream and loading a plurality of function modules to perform video decoding; generating a plurality of tasks using the input bitstream and the function modules and queuing the tasks in one or more buffers according to the functions respectively corresponding to the tasks; enabling a multi-core processor to perform a video decoding operation on the input bitstream using the function modules, the multi-core processor comprising a plurality of cores including a first core and a second core; and allocating part of a remaining task of the second core to the first core, if the first core becomes idle during the video decoding operation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
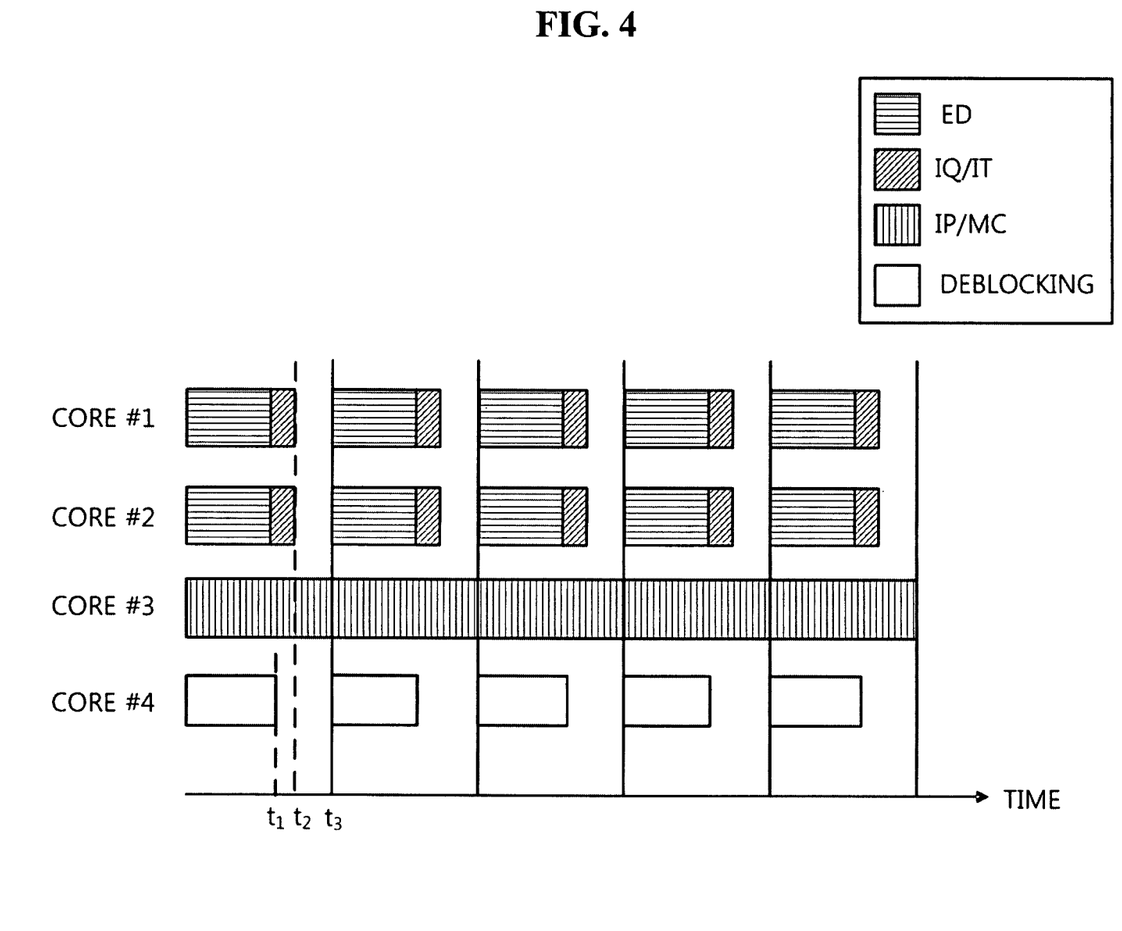
FIG. 4 illustrates a diagram explaining a video decoding operation performed by a typical multi-core processor.
Figure 5:
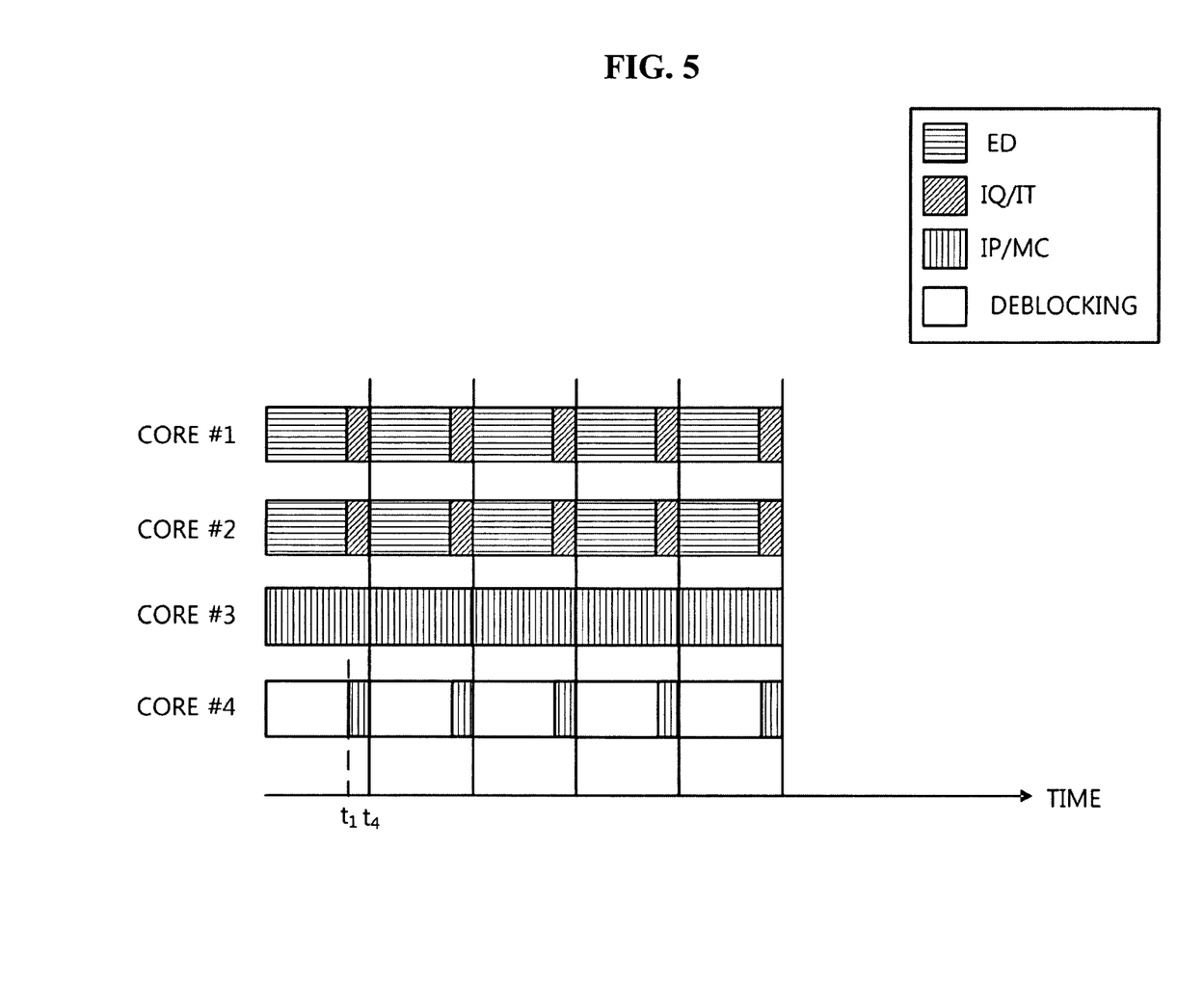
FIG. 5 illustrates a diagram explaining the application of a dynamic load-balancing process to the multi-core processor environment illustrated in FIG. 4.

FIGS. 4 and 5 show a dynamic load-balancing process according to an embodiment of the present invention. FIG. 4 shows a video decoding operation performed by a conventional multi-core processor. Referring to FIG. 4, cores 1 and 2 both perform entropy decoding (ED) and inverse quantization/inverse transform (IQ/IT), core 3 performs intra-prediction/motion compensation (IP/MC), and core 4 performs deblocking.

The operation of core 4 is completed at a time $t_1$. The operations of cores 1 and 2 are both completed at a time $t_2$. However, cores 1 and 2 may both be placed in an idle state and prevented from processing an image (or hundreds of macroblocks) until the operation of core 3 is complete. Thus, the performance of a multi-core processor may deteriorate.

FIG. 5 shows the application of a dynamic load-balancing process to the environment shown in FIG. 4. When the functions of a multi-core processor are distributed among a number of cores of the multi-core processor, as shown in FIG. 4, some cores may become idle even when other cores are yet to complete their tasks. In this case, part of the task of a non-idle core may be allocated to an idle core, thereby reducing or preventing an idle time of each core Specifically, as shown in FIG. 5, core 4 is placed in an idle state at a time $t_1$, and notifies core 3 of the idle state. Then, core 3 allocates some of the remaining task to core 4 and/or to cores 1 and 2. If one of cores 1 through 4 is overloaded, some of the task of whichever of cores 1 through 4 is overloaded is allocated to the other cores so that the loads of cores 1 through 4 can be dynamically balanced. Cores 1 through 4 may then be able to complete their tasks at a time $t_4$.

Figure 6:
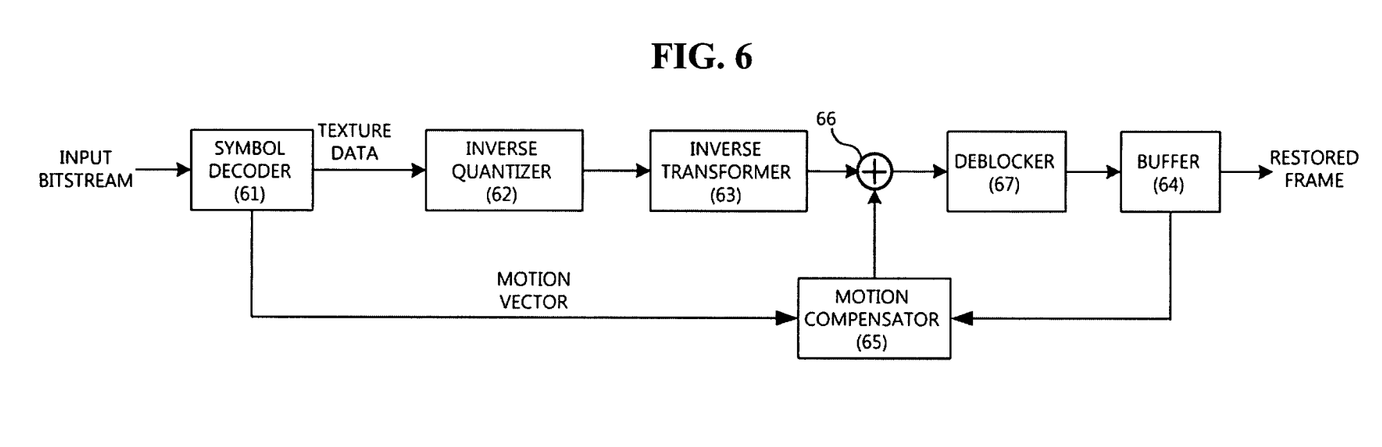
FIG. 6 illustrates a block diagram explaining a video decoding process according to an embodiment of the present invention.

FIG. 6 shows a video decoding process according to an embodiment of the present invention. Referring to FIG. 6, a symbol decoder 61 obtains motion vectors and texture data by performing a lossless decoding operation on an input bitstream. The symbol decoder 61 may perform a lossless decoding operation using a Huffman decoding method, an arithmetic decoding method, or a variable length decoding method. In general, the motion vector of a predetermined macroblock is dependent upon the motion vectors of a number of macroblocks adjacent to the predetermined macroblock and thus may not be determined until the motion vectors of the macroblocks adjacent to the predetermined macroblock are determined. If a plurality of data that is dependent upon one another is processed by different cores, the plurality of data may not be able to be processed in parallel properly. Thus, in order to dynamically balance the load of each core, a plurality of data that are dependent upon one another may be allocated to and processed by a single core.

The texture data obtained by the symbol decoder 61 is provided to an inverse quantizer 62. The motion vectors obtained by the symbol decoder 61 are provided to a motion vector compensator 65. The inverse quantizer 62 inversely quantizes the test data provided by the symbol decoder 61. Inverse quantization is a process of restoring data from indexes generated by a quantization operation using the same quantization table used in quantization.

An inverse transformer 63 restores a high-frequency image by inversely transforming the inversely quantized test data provided by the inverse quantizer 62. Specifically, the inverse transformer 63 may inversely transform the inversely quantized test data provided by the inverse quantizer 62 using the inverse discrete cosine transform (DCT) transform method or an inverse wavelet transform method. The inverse transformer 63 may transmit the high-frequency image to an adder 66.

The motion compensator 65 generates a predicted image by performing motion compensation on at least one reference frame, which has already been restored and is present in a buffer 64, using the motion vector of a current macroblock provided by the symbol decoder 61. If motion compensation is performed in units of half pixels or quarter pixels, a considerable amount of computation may be required for an interpolation operation to generate the predicted image. If motion compensation is performed using two reference frames, a plurality of macroblocks obtained by the motion compensation may be averaged. In this case, the macroblocks may be dependent upon one another and may thus need to be processed by a single core.

The adder 66 restores an image of the current macroblock by adding the high-frequency image provided by the inverse transformer 63 and the predicted image provided by the motion compensator 65. A deblocker 67 removes block artifacts from the restored image by applying a deblock filter. Since the restored image is processed in units of macroblocks, noise may occur along the boundaries among the macroblocks. Such noise is referred to as a block artifact. The higher the compression rate of video data, the more block artifacts are generated. An image obtained by applying the deblock filter to the restored image may be stored temporarily in the buffer 64 for later use in the restoration of other images.

Not all macroblocks are restored through motion compensation. Some macroblocks may be coded through intra-prediction. Macroblocks coded through intra-prediction are referred to as intra-macroblocks. Intra-prediction is a process of restoring a current macroblock based on an image of a macroblock belonging to the same frame as the current macroblock and adjacent to the current macroblock. In this case, the current macroblock is highly likely to be dependent upon other macroblocks, and, thus, the current macroblock and the macroblocks upon which the current macroblock is dependent need to be processed by the same core.

Figure 7:
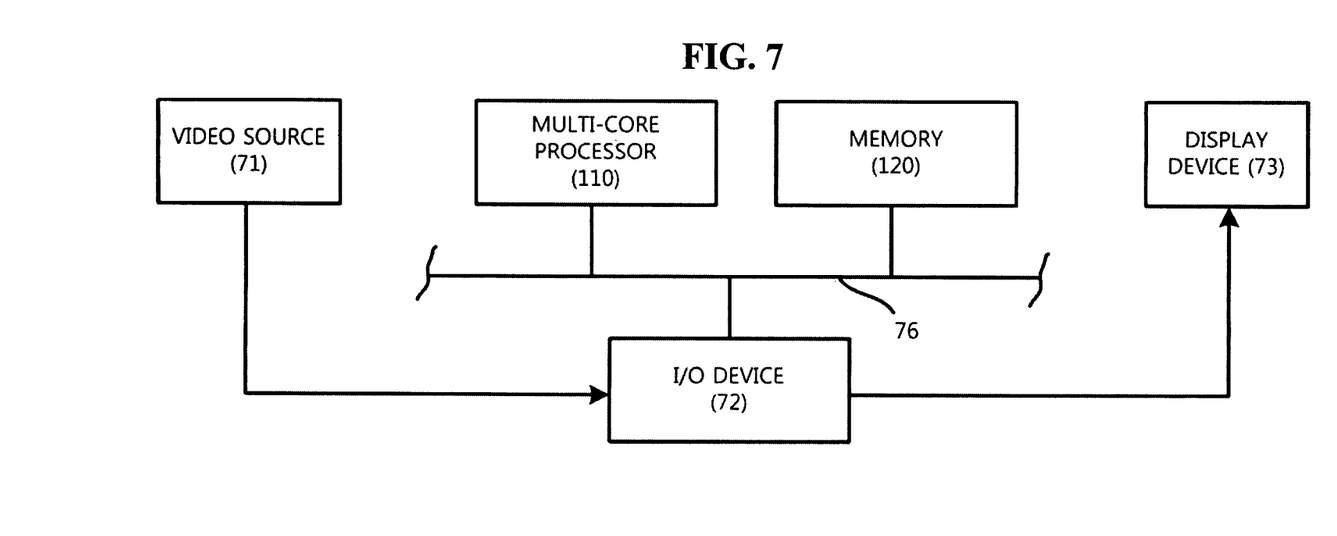
FIG. 7 illustrates a multi-core processor system according to an embodiment of the present invention.

FIG. 7 shows a multi-core processor system according to an embodiment of the present invention. The system may be a TV set, a set-top box, a desktop computer, a laptop computer, a palmtop computer, a personal digital assistant (PDA), a video/audio storage device (e.g., a video cassette recorder (VCR) or a digital video recorder (DVR)), or a combination thereof. Alternatively, the system may be a device including any one of a TV set, a set-top box, a desktop computer, a laptop computer, a palmtop computer, a PDA, and a video/audio storage device. The system may include at least one video source 71, at least one input/output (I/O) device 72, a multi-core processor 110, a memory 120, and a display device 73. According to other aspects of the present invention, the system may include additional and/or different units. Similarly, the functionality of two or more of the above units may be integrated into a single component.

The video source 71 may be a TV receiver, a VCR, or another video storage device. Alternatively, the video source 71 may be a network connection for receiving video data from a server through the Internet, a wide area network (WAN), a local area network (LAN), a terrestrial broadcast system, a cable network, a satellite communication network, a wireless network, a telephone network or a combination thereof. Further, the video source 71 may be a network including any one of the Internet, a wide area network (WAN), a local area network (LAN), a terrestrial broadcast system, a cable network, a satellite communication network, a wireless network, and a telephone network. The video source 71 may be interpreted not only as a path for obtaining video data but also as a compressed bitstream obtained using a predetermined video compression algorithm.

The I/O device 72, the multi-core processor 110, and the memory 120 may communicate with one another through a communication medium 76. The communication medium 76 may be a communication bus, a communication network, or at least one internal connection circuit. The multi-core processor 110 may process input video data provided by the video source 71 using at least one software program present in the memory 120. The multi-core processor 110 may be an integrated circuit that includes two or more cores for providing better performance, consuming less power, and effectively processing a plurality of tasks at the same time.

The multi-core processor 110 may generate output video data to be displayed by the display device 73. The display device 73 may be a liquid crystal display (LCD), a light-emitting diode (LED), an organic light-emitting diode (OLED), a plasma display panel (PDP), or another image display tool.

The software programs present in the memory 120 may include a video decoder module for performing the video decoding operation illustrated in FIG. 6. The video decoder module may be stored in the memory 120, may be read out from a storage medium such as a CD-ROM or a floppy disc, or may be downloaded from a network. The video decoder module may be replaced with a hardware circuit or the combination of a software program and a hardware circuit. The memory 120 may include a buffer or a queue for temporarily storing data to be processed.

Figure 8:
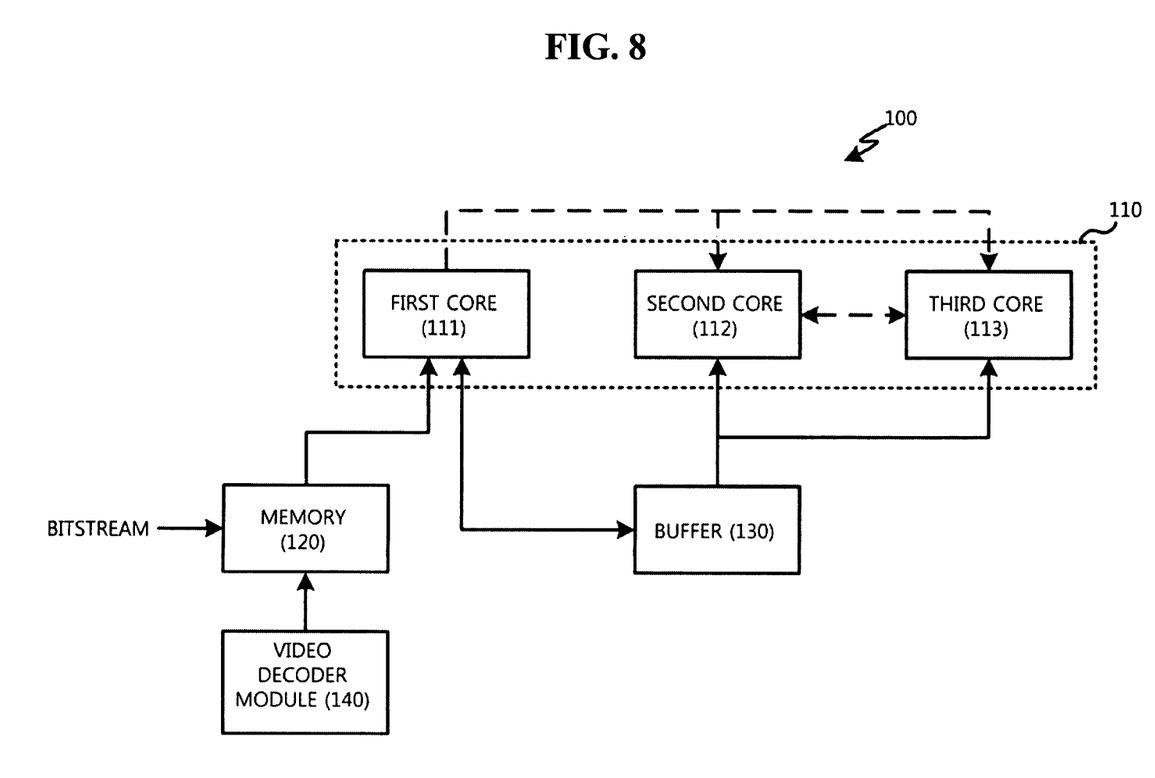
FIG. 8 illustrates a multi-core processor device according to an embodiment of the present invention, which provides a dynamic load-balancing function.

FIG. 8 shows a multi-core processor apparatus 100 according to an embodiment of the present invention, which provides a dynamic load-balancing function. The multi-core processor apparatus 100 includes a multi-core processor 110, a memory 120, a buffer 130 and a video decoder module 140. The multi-core processor apparatus 100 basically adopts the functional division method shown in FIG. 1. Each of a plurality of first through third cores 111 through 113 in the multi-core processor 110 generally performs certain functions only. However, in order to remove or reduce an idle time, if any one of the first through third cores 111 through 113 has already completed its task and thus becomes idle, the other cores may be notified of the existence of the idle core and may allocate part of their tasks to the idle core.

The video decoder module 140 may be a video decoding software program for performing the video decoding operation shown in FIG. 6. The video decoder module 140 may include various function modules such as a symbol decoder, an inverse quantizer, an inverse transformer, and a motion compensator. The video decoding module 140 may be a video decoding software program that complies with an existing video decoding standard such as MPEG-2, MPEG-4, or H.264.

The memory 120 stores an input bitstream, and loads the function modules of the video decoder module 140. The input bitstream may be compressed video data provided by a video encoder (not shown). The memory 120 may be a nonvolatile memory, such as a read-only memory (ROM), a programmable ROM (PROM), an erasable PROM (EPROM), or an electrically EPROM (EEPROM); a volatile memory, such as a random access memory (RAM); or a storage medium, such as a hard disc or an optical disc. The buffer 130 temporarily stores a task or data of an image block that needs to be processed by the multi-core processor 110. The buffer 130 may be incorporated into the memory 120 or may be separate from the memory 120.

The multi-core processor 110 includes at least two cores. The multi-core processor 110 is shown in FIG. 8 as including three cores, but aspects of the present invention are not restricted to this. The multi-core processor 110 may include two cores or four or more cores. Assuming that a video decoding operation is divided into symbol decoding, inverse quantization/inverse transform, and motion compensation, the first core 111 may perform symbol decoding, the second core 112 may perform motion compensation, and the third core 113 may perform inverse quantization/inverse transform.

Specifically, the first core 111 reads a function module loaded in the memory 120 and the input bitstream and queues its task in the buffer 130. A task may be queued in the buffer 130 in units of sub-blocks, which are obtained by dividing a macroblock and are the unit of allocation of a motion vector. The first through third cores 111 through 113 may perform their respective tasks currently being queued in the buffer 130 according to the functional division method. Then, if any of the first through third cores 111 through 113 becomes idle, the other cores should allocate part of their tasks to the idle core.

Figure 9:
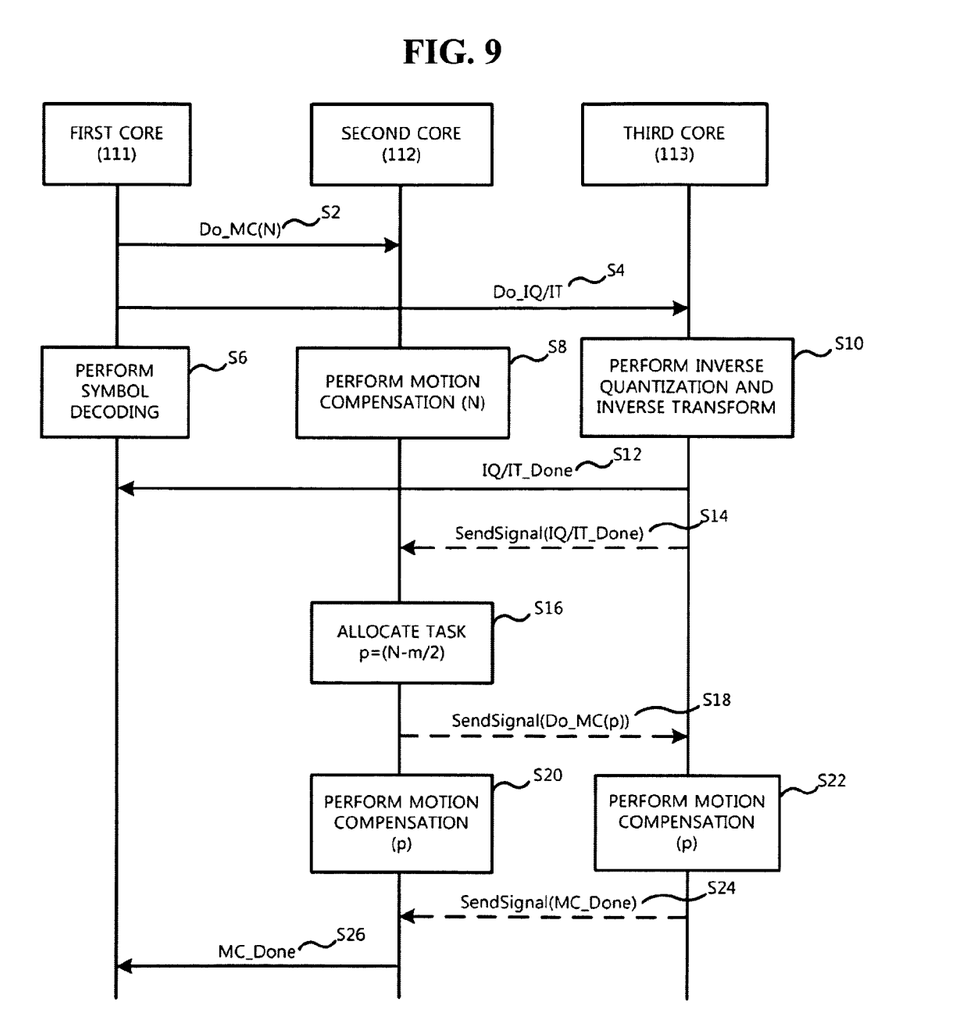
FIG. 9 illustrates a sequence diagram of a dynamic load-balancing process according to an embodiment of the present invention.

FIG. 9 shows a sequence diagram explaining a dynamic load-balancing process according to an embodiment of the present invention. Referring to FIGS. 8 and 9, the first core 111 transmits a control message Do_MC(N) to the second core 112 (where N indicates the number of image blocks, such as macroblocks or sub-blocks, that are present in the buffer 130 and need to be processed) that requests the second core 112 to perform motion compensation in operation S2. Thereafter, the first core 111 transmits a control message Do_IQ/IT that requests the third core 113 to perform inverse quantization/inverse transform to the third core 113 in operation S4.

The first through third cores 111 through 113 then perform their respective tasks simultaneously. The first core 111 performs symbol decoding in operation S6, the second core 112 performs motion compensation in operation S8, and the third core 113 performs inverse quantization and inverse transform in operation S10. Inverse quantization and inverse transform may be performed only when symbol decoding is complete. However, if the symbol decoding operation performed in operation S6 is not for a current image block but for a subsequent image block, a symbol decoding operation for the current image block may have already been complete. Once the symbol decoding operation performed in operation S6 is complete, the first core 111 queues tasks that need to be performed by the second and third cores 112 and 113 in the buffer 130. The first core 111 may queue the tasks that need to be performed by the second and third cores 112 and 113 in the same buffer. Alternatively, the first core 111 may generate two different buffers for the second and third cores 112 and 113. Then, the first core 111 may queue the task that needs to be performed by the second core 112 in the buffer corresponding to the second core 112, and queue the task that needs to be performed by the third core 113 in the buffer corresponding to the second core 113.

If the third core 113 completes inverse quantization and inverse transform while the first through third cores 111 through 113 perform their respective tasks according to the functional division method, the third core 113 transmits a control message IQ/IT_Done indicating that the third core 113 has completed its task to the first core 111 in operation S12. Then, the third core 113 becomes idle. In addition, the third core 113 transmits a signal SendSignl(IQ/IT_Done) indicating that it has completed its task to the second core 112 in operation S14.

The second core 112 allocates an amount p of the second core 112 remaining task to the third core 113 in operation S16 and transmits a signal SendSignal(Do_MC(p)) requesting the third core 113 to perform a task corresponding to the amount p to the third core 113 in operation S18. It may be arbitrarily determined how much of the remaining task of the second core 112 is to be allocated to the third core 113. The allocated amount p may be determined by adding 1 to the number of idle cores and dividing the remaining amount of the task of the second core 112 by the result of the addition. For example, if the total amount of the task (i.e., motion compensation) of the second core 112 is N and an amount of the task of the second core that has already been complete is m, the second core 112 may allocate half of its remaining task (i.e., N−m) to the third core 113.

Thereafter, the second and third cores 113 perform motion compensation together in operations S20 and S22. The second and third cores 112 and 113 may extract tasks allocated thereto from the buffer 130 and perform the extracted tasks. For this, the first through third cores 111 through 113 may set a check bit in their respective tasks queued in the buffer 130. If the third core 113 completes the task corresponding to the amount p allocated thereto, the third core 113 transmits a signal SendSignal(MC_Done) indicating that the third core 113 has completed the task corresponding to the amount p to the second core 112 in operation S24. If the task of the second core 112 is complete, the second core 112 transmits a control message MC_Done indicating that it has completed its task to the first core 111 in operation S26.

An example of the application of the dynamic load-balancing process of the embodiment of FIG. 9 to the conventional functional division method has been described above. The dynamic load-balancing method of the embodiment of FIG. 9 does not cause any serious problems if the tasks queued in the buffer 130 are all independent. However, if not all the tasks queued in the buffer 130 are independent, the dynamic load-balancing method of the embodiment of FIG. 9 may not be used as is, but may need to be slightly modified.

Figure 10:
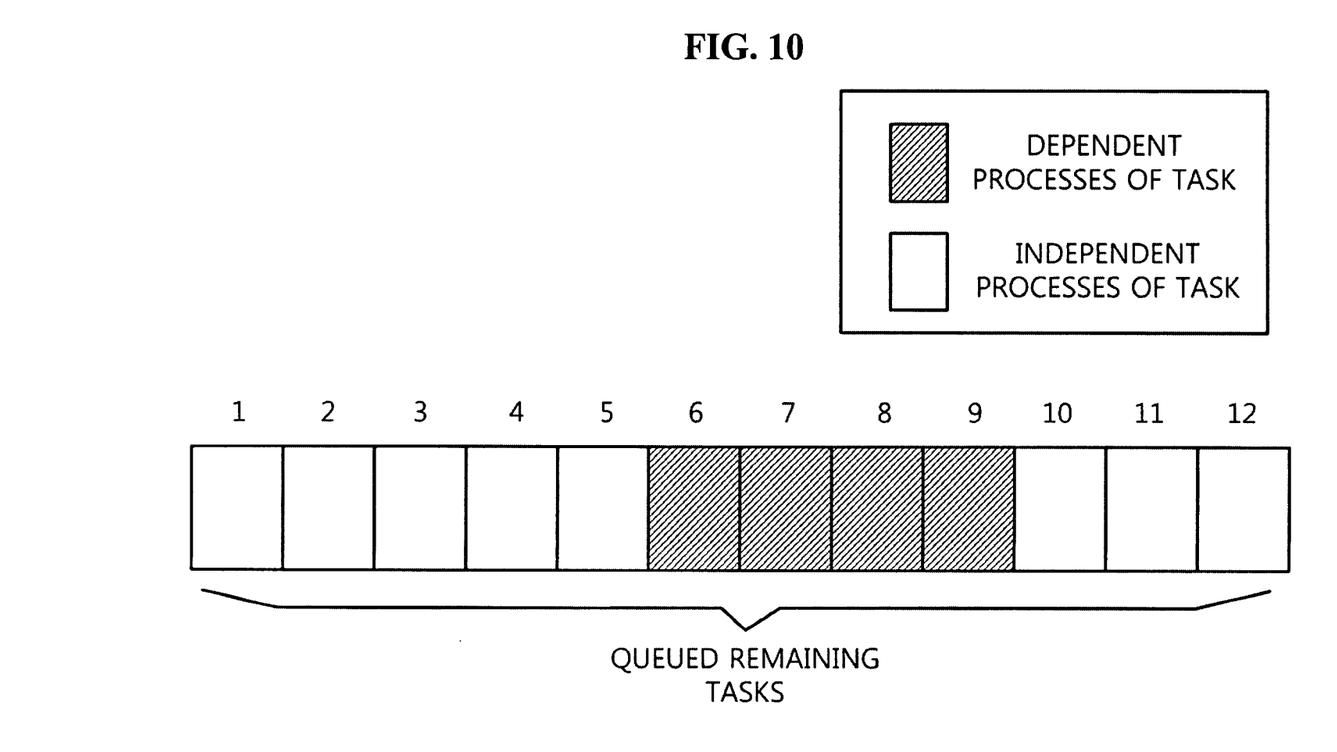
FIG. 10 illustrates a diagram for explaining the case when tasks queued in a buffer include both dependent tasks and independent tasks.

The first core 111 may classify tasks into dependent tasks and independent tasks and set a check bit in each of the dependent tasks. Then, the first core 111 may queue the dependent tasks and the independent tasks in different buffers. For example, if the third core 113 is idle and there are twelve processes that need to be processed by the second core 112, as shown in FIG. 10, processes 6 through 9 are dependent on one another and may thus need to be processed by the same core. Therefore, the second core 112 may allocate processes 1, 2, and 6 through 9 to the second core 112, and allocate processes 3 through 5 and 10 through 12 to the third core 113. Alternatively, the second core 112 may allocate processes 3 through 5 and 10 through 12 to the second core 112, and allocate processes 1, 2, and 6 through 9 to the third core 113.

According to the embodiment of FIG. 9, dependent processes are allocated to the same core. However, it is still possible to effectively balance the loads of cores by appropriately distributing other independent processes between cores.

As described above, the multi-core processor device 100 can minimize an idle time, if any, of each core by applying dynamic load balancing to the functional division method. However, all cores of a multi-core processor may not necessarily perform their functions on the same image block, and this will hereinafter be described in detail with reference to FIG. 11.

Figure 11:
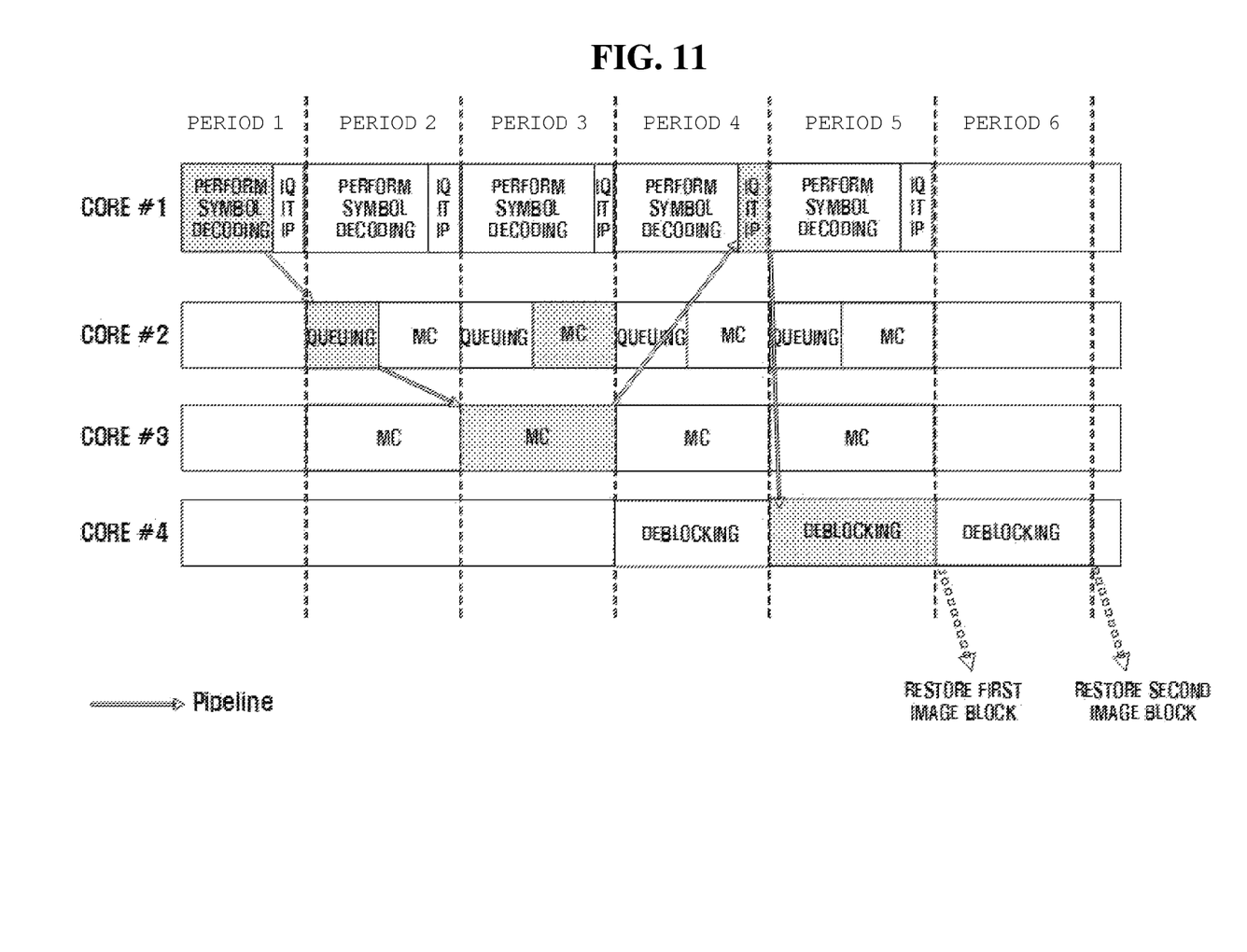
FIG. 11 illustrates a pipeline diagram explaining a video decoding process using a multi-core processor, according to an embodiment of the present invention.

Referring to FIG. 11, gray blocks indicate tasks that are performed on a current image block at the same time. During period 1, core 1 performs the symbol decoding operation on a current image block. During period 2, core 2 queues a plurality of tasks in a buffer using the results of the symbol decoding operation. During period 3, core 3 performs a motion compensation operation on the current image block, identifies that core 2 is idle, and allocates part of its task (i.e., motion compensation) to core 2.

When motion compensation for the current image block is complete, core 1 performs inverse quantization, inverse transform and intra-prediction on the current image block during period 4. During period 5, core 4 performs deblocking on the current image block and thus removes block artifacts from the current image block. In this manner, first and second image blocks can be restored.

Video decoding using the dynamic load-balancing method according to the present invention and video decoding using a multi-core processor and the conventional functional division method were tested. The test results are as presented by Table 1 below.

TABLE 1

Comparison of Dynamic Load-balancing and Conventional Video Decoding

|  | Core 1 | Core 2 |
| --- | --- | --- |
| Prior Art | 13.45 ms/frame | 39.95 ms/frame |
| Present Invention | 26.40 ms/frame | 27.01 ms/frame |

In the above-mentioned tests, core 2 only performed motion compensation and core 1 performed operations, other than motion compensation. Core 2 used a motion compensation method with high computation load such as a quarter pixel motion compensation method. Referring to Table 1, according to the prior art, core 1 has an idle time of 26.5 ms until core 2 completes its task. In contrast, according to aspects of the present invention, core 1 only has an idle time of 0.61 ms until core 2 completes its task.

According to aspects of the present invention, it is possible to improve the performance of video decoding by efficiently balancing the loads of cores in a multi-core processor environment. According to additional aspects of the present invention, it is possible to dynamically allocate function modules of a video decoder module to cores in consideration of dependency between major computation processes.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CDs, DVDs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A multi-core processor device comprising:
a video decoder module comprising a plurality of function modules for repeatedly performing a video decoding operation;
a memory to store an input bitstream and to load the function modules; and
a multi-core processor comprising a plurality of cores, each core dedicated to performing one or more function modules from among the plurality of function modules, the cores including at least a first core and a second core,
wherein, in response to the first core finishing one or more respective function modules dedicated thereto during a respective video decoding operation, the second core allocates part of a remaining task of one or more other function modules dedicated to the second core, to the first core, to reduce an idle time of the first core during the respective video decoding operation, and
wherein, if the first core becomes idle, the first core transmits a signal to the second core indicating that the first core is idle.

2. The multi-core processor device of claim 1, wherein the function modules comply with the H.264 standard.

3. The multi-core processor device of claim 1, wherein the function modules comprise a symbol-decoding module, an inverse quantization module, an inverse transform module, and a motion compensation module.

4. The multi-core processor device of claim 1, wherein the multi-core processor further comprises a third core to generate a plurality of tasks using the input bitstream and the function modules and to queue the tasks in one or more buffers according to the functions respectively corresponding to the tasks.

5. The multi-core processor device of claim 4, wherein the third core classifies the tasks into independent tasks and dependent tasks and queues the independent tasks and the dependent tasks in the same buffer or in different buffers.

6. The multi-core processor device of claim 1, wherein the second core determines how much of the remaining task of the second core is to be allocated to the first core by adding 1 to the number of idle cores and dividing the remaining task of the second core by the result of the addition, and allocates an amount of the remaining task to the first core corresponding to the result of the determination.

7. The multi-core processor device of claim 6, wherein, if the first core completes the task allocated thereto by the second core, the first core transmits a signal indicating that the first core has completed the task allocated thereto by the second core to the second core.

8. The multi-core processor device of claim 1, wherein one or more processes of the remaining task of the second core that are dependent on each other are all allocated to the same core.

9. The multi-core processor device of claim 1, wherein the remaining task of the second core corresponds to motion compensation.

10. A video decoding method using a multi-core processor, the video decoding method comprising:
storing an input bitstream and loading a plurality of function modules for repeatedly performing a video decoding operation;
generating a plurality of tasks using the input bitstream and the plurality of function modules and queuing the tasks in one or more buffers according to the functions respectively corresponding to the tasks;
performing, by a multi-core processor, video decoding on the input bitstream using the function modules, the multi-core processor comprising a plurality of cores, each core dedicated to performing one or more function modules from among the plurality of function modules, and the plurality of cores including at least a first core and a second core;

in response to the first core finishing one or more function modules dedicated thereto during a respective video decoding operation, allocating part of a remaining task of one or more other function modules dedicated to the second core, to the first core, to reduce an idle time of the first core during the respective video decoding operation; and transmitting a signal to the second core indicating that the first core has completed the allocated task, if the first core completes the allocated task.

11. The video decoding method of claim 10, wherein the function modules comply with the H.264 standard.

12. The video decoding method of claim 10, wherein the function modules comprise a symbol-decoding module, an inverse quantization module, an inverse transform module and a motion compensation module.

13. The video decoding method of claim 12, wherein the queuing of the tasks comprises classifying the tasks into independent tasks and dependent tasks and queuing the independent tasks and the dependent tasks in the same buffer or in different buffers.

14. The video decoding method of claim 10, further comprising transmitting a signal to the second core indicating that the first core is idle, if the first core becomes idle.

15. The video decoding method of claim 14, wherein the allocating of part of the remaining task of the second core to the first core comprises:

determining how much of the remaining task of the second core is to be allocated to the first core by adding 1 to the number of idle cores and dividing the remaining task of the second core by the result of the addition; and allocating an amount of the remaining task of the second core corresponding to the result of the determination.

16. The video decoding method of claim 10, wherein two or more processes of the remaining task of the second core that are dependent on each other are all allocated to the same core.

17. The video decoding method of claim 10, wherein the remaining task of the second core corresponds to motion compensation.

\* \* \* \* \*